United States Patent
Oozeki

(10) Patent No.: US 8,896,753 B2
(45) Date of Patent: Nov. 25, 2014

(54) CONTROL OF LIGHT EMISSION AT DIFFERENT BRIGHTNESSES CORRESPONDING TO OPERATION MODE

(71) Applicant: NEC Corporation, Minato-ku, Tokyo (JP)

(72) Inventor: Keisuke Oozeki, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

(21) Appl. No.: 13/735,416

(22) Filed: Jan. 7, 2013

(65) Prior Publication Data
US 2013/0162888 A1   Jun. 27, 2013

Related U.S. Application Data

(63) Continuation of application No. 12/744,455, filed as application No. PCT/JP2008/071347 on Nov. 25, 2008, now abandoned.

(30) Foreign Application Priority Data

Nov. 22, 2007   (JP) .................................. 2007-302529

(51) Int. Cl.
| H04N 5/222 | (2006.01) |
| H04N 5/232 | (2006.01) |
| H04N 5/225 | (2006.01) |
| G03B 15/05 | (2006.01) |
| G03B 17/18 | (2006.01) |
| H04N 7/14 | (2006.01) |

(52) U.S. Cl.
CPC ....... *H04N 5/23212* (2013.01); *H04N 5/23245* (2013.01); *H04N 5/2256* (2013.01); *G03B 15/05* (2013.01); *G03B 17/18* (2013.01); *H04N 2007/145* (2013.01)
USPC .......................................................... 348/371

(58) Field of Classification Search
USPC ................................................. 348/371, 370
See application file for complete search history.

(56) References Cited

U.S. PATENT DOCUMENTS 5,227,824 A * 7/1993 Yoshida et al. ................. 396/60
5,649,238 A * 7/1997 Wakabayashi et al. ......... 396/61
(Continued)

FOREIGN PATENT DOCUMENTS

| JP | 2004-222037 A | 8/2004 |
| JP | 2006-208984 A | 8/2006 |

(Continued)

OTHER PUBLICATIONS

Japanese Office Action for JP2009-542617 mailed on Feb. 5, 2013 with Partial English Translation.

*Primary Examiner* — Gary C Vieaux
(74) *Attorney, Agent, or Firm* — Sughrue Mion, PLLC

(57) ABSTRACT

A camera-mounted cellular phone (1) comprises a camera sensor (3) which picks up an image, a switch (2) which is configured to switch and set at least equal to or more than two operation modes each corresponding to an image-pickup distance from the camera sensor (3) to an object, and an LED (4) which emits light together with an image-pickup. At the time of image-pickup, an image-pickup operation is performed by controlling a focal point of the camera sensor (3) in accordance with an operation mode switched and set by the switch (2), and the luminous brightness of the LED (4) is controlled in accordance with the operation mode switched and set.

5 Claims, 9 Drawing Sheets

(56) References Cited

U.S. PATENT DOCUMENTS

| | | | |
|---|---|---|---|
| 5,708,866 A * | 1/1998 | Leonard | 396/62 |
| 2004/0242184 A1 * | 12/2004 | Ito | 455/344 |
| 2005/0157208 A1 * | 7/2005 | Park et al. | 348/371 |
| 2005/0212955 A1 * | 9/2005 | Craig et al. | 348/362 |
| 2008/0080851 A1 * | 4/2008 | Endo | 396/157 |

FOREIGN PATENT DOCUMENTS

| | | |
|---|---|---|
| JP | 2007-171518 A | 7/2007 |
| JP | 2009-38991 | 2/2009 |

* cited by examiner

FIG. 5

| CAMERA OPERATION MODE | LUMINOUS BRIGHTNESS OF LED | REMARKS |
|---|---|---|
| NORMAL MODE | HIGH | THE VISIBILITY OF LED FOR PREVENTING SECRET IMAGE-PICKUP IS GOOD, BUT LIGHT IS LIKELY TO GO AROUND |
| CLOSEUP MODE | LOW | THE VISIBILITY OF LED FOR PREVENTING SECRET IMAGE-PICKUP IS POOR, BUT LIGHT IS NOT LIKELY TO GO AROUND |

FIG. 9

| CAMERA OPERATION MODE | WHICH LED EMIT LIGHT? | LUMINOUS BRIGHTNESS OF LED | REMARKS |
|---|---|---|---|
| NORMAL MODE | LED9 | HIGH | LED LOCATED NEAR CAMERA SENSOR 3 EMITS LIGHT AT HIGHER BRIGHTNESS. CONSEQUENTLY, THE VISIBILITY OF IMAGE-PICKUP ACTION BECOMES IMPROVED. |
| CLOSEUP MODE | LED10 | LOW | LED LOCATED APART FROM CAMERA SENSOR 3 EMITS LIGHT AT LOWER BRIGHTNESS. CONSEQUENTLY, THIS FURTHER PREVENTS LIGHT FROM GOING AROUND CAMERA SENSOR 3. |

CONTROL OF LIGHT EMISSION AT DIFFERENT BRIGHTNESSES CORRESPONDING TO OPERATION MODE

TECHNICAL FIELD

The present invention relates to an image-pickup device with a light-emission operation at the time of image-pickup, an information processing terminal, a cellular phone, a program, and a light-emission control method.

BACKGROUND ART

Recently, reduction in size and weight of a camera image-pickup device equipped in a camera or a cellular phone are advanced. In particular, a camera-mounted cellular phone is widespread among general users, and this makes it possible for users to casually pick up an image regardless of a location. However, fraudulent image-pickup, i.e., a secret-image-pickup action increases and becomes a problem in accordance with reduction in size and weight of a camera.

Because of the foregoing problem, a camera-mounted cellular phone has a function of emitting light when picking up an image, or of outputting sound (shutter sound) or the like for preventing secret image-pickup. This allows individuals around a user of the camera-mounted cellular phone to visibly recognize lighting-up of light, or to recognize sound, so that it is possible to notify an image-pickup action to the individuals therearound. As a result, it becomes possible to suppress any secret-image-pickup action in advance.

Moreover, various technologies have been developed as a technique of surely notifying an image-pickup action to people around a user of the camera-mounted cellular phone. For example, a technology disclosed in following patent literature 1 first measures a distance from an image-pickup device to an object based on the position of a lens focused by an auto-focus function of the image-pickup device. Next, an amount of light that is emitted to notify an image-pickup action (image-pickup notification light) is set based on the measured distance. More specifically, the farther the distance from the image-pickup device to the object is, the more the amount of light of the image-pickup notification light to be output is set. This enables notification of an image-pickup action more surely to an object located apart from the image-pickup device and individuals around the user of the image-pickup device.

Patent Literature 1: Unexamined Japanese Patent Application KOKAI Publication No. 2005-303719.

DISCLOSURE OF INVENTION

Problem to be solved by the Invention

However, the technology disclosed in the foregoing patent literature 1 is for an image-pickup device equipped with an auto-focus function. Consequently, such technology cannot be applied to an image-pickup device without the auto-focus function, and thus lacks versatility. Conversely, it is necessary that an image-pickup device should be equipped with the auto-focus function in order to realize the above-explained secret-image-pickup prevention technology. In this case, production steps become complex and a cost increases due to the increase of the number of components, so that this becomes a problem.

Moreover, it is necessary that a light emitter for a light-emission operation like an LED should be arranged near a camera so as to facilitate recognition of an image-pickup action, and such light emitter should light up at brightness with good visibility. However, when the light emitter is arranged near the camera, there is a problem that light emitted from the light emitter goes around a sensor of the camera and comes therein at the time of closeup, thereby causing a picked-up image to be fuzzy, and deteriorating an image quality.

The present invention has been made in view of the foregoing problem, and it is an object of the present invention to provide an image-pickup device which can improve an image quality at the time of closeup and which has high versatility at a low cost and an image-pickup control method.

Means for solving the problem

An image-pickup device according to the present invention comprises a camera unit which picks up an image, and light-emission means which emits light together with an image-pickup operation by the camera unit, and the image-pickup device further comprises:

operation mode setting means which is configured to switch and set at least equal to or more than two operation modes each corresponding to an image-pickup distance from the camera unit to an object;

camera control means which performs an image-pickup operation by controlling a focal point of the camera unit in accordance with an operation mode switched and set by the operation mode setting means; and light-emission control means which controls a light-emission operation of the light-emission means in accordance with the operation mode switched and set by the operation mode setting means.

An image-pickup device according to the present invention comprises a camera unit which picks up an image, and a plurality of light-emission means which are arranged apart from the camera unit at different distances therefrom and which emit light together with an image-pickup operation by the camera unit, and the image-pickup device further comprises:

an operation mode setting means which is configured to switch and set at least equal to or more than two operation modes each corresponding to an image-pickup distance from the camera unit to an object;

camera control means which performs an image-pickup operation by controlling a focal point of the camera unit in accordance with an operation mode switched and set by the operation mode setting means; and light-emission control means which controls the light-emission means that is arranged in a position closer and closer to the camera unit to emit light when an image-pickup distance corresponding to the operation mode switched and set by the operation mode setting means is longer and longer.

Moreover, the image-pickup device according to the present invention can be equipped in an information processing terminal, and in a cellular phone.

A program according to the present invention allows a control unit of an image-pickup device comprising a camera unit which picks up an image, and light-emission means which emits light together with an image-pickup operation by the camera unit to function as:

operation mode setting means which is configured to switch and set at least equal to or more than two operation modes each corresponding to an image-pickup distance from the camera unit to an object;

camera control means which performs an image-pickup operation by controlling a focal point of the camera unit in accordance with an operation mode switched and set by the operation mode setting means; and light-emission control means which controls a light-emission operation of the light-emission means in accordance with the operation mode switched and set by the operation mode setting means.

A program according to the present invention allows a control unit of an image-pickup device comprising a camera unit which picks up an image, and a plurality of light-emission means which are arranged apart from the camera unit at different distances therefrom and which emit light together with an image-pickup operation by the camera unit to function as:

operation mode setting means which is configured to switch and set at least equal to or more than two operation modes each corresponding to an image-pickup distance from the camera unit to an object;

camera control means which performs an image-pickup operation by controlling a focal point of the camera unit in accordance with an operation mode switched and set by the operation mode setting means; and light-emission control means which controls the light-emission means that is arranged in a position closer and closer to the camera unit to emit light when an image-pickup distance corresponding to the operation mode switched and set by the operation mode setting means is longer and longer.

A method of controlling light-emission according to the present invention is for controlling light-emission of light-emission means in an image-pickup device comprising a camera unit which picks up an image, and the light-emission means which emits light together with an image-pickup operation by the camera unit, and the method comprises:

an operation mode setting step of switching and setting at least equal to or more than two operation modes each corresponding to an image-pickup distance from the camera unit to an object;

an operation mode detection step of detecting an operation mode switched and set in the operation mode setting step; and an image-pickup light emission control step of performing an image-pickup operation by controlling a focal point of the camera unit in accordance with an image-pickup distance corresponding to the operation mode detected in the operation mode detection step, and of controlling light-emission operation of the light-emission means in accordance with the image-pickup distance.

A method of controlling light-emission according to the present invention is for controlling light-emission of light-emission means in an image-pickup device comprising a camera unit which picks up an image, and a plurality of light-emission means which are arranged apart from the camera unit at different distances therefrom and which emit light together with an image-pickup operation by the camera unit, and the method comprises:

an operation mode setting step of switching and setting at least equal to or more than two operation modes each corresponding to an image-pickup distance from the camera unit to an object;

an operation mode detection step of detecting an operation mode switched and set by the operation mode setting means; and an image-pickup light emission control step of performing an image-pickup operation by controlling a focal point of the camera unit in accordance with an image-pickup distance corresponding to the operation mode detected in the operation mode detection step, and of controlling the light-emission means which is arranged in a position closer and closer to the camera unit to emit light when the image-pickup distance is longer and longer.

Effect of the invention

The present invention enables notification of an image-pickup action appropriately to individuals around a user of an image-pickup device by light-emission together with an image-pickup operation. At this time, in particular, when an image-pickup distance corresponding to a set operation mode is shorter than an image-pickup distance corresponding to another switchable operation mode, the light from an LED is prevented from going around a sensor of a camera and coming therein. Consequently, the present invention has a new superior effect which suppresses any occurrence of making a picked-up image fuzzy, and can avoid deterioration of an image quality.

BRIEF DESCRIPTION OF DRAWINGS

FIG. 5 is a table showing a relation between an operation mode and the luminous brightness of the LED according to a first embodiment;

FIG. 9 is a table showing a relation among an operation mode, light-emission means, and luminous brightness according to a second embodiment.

Figure 1:
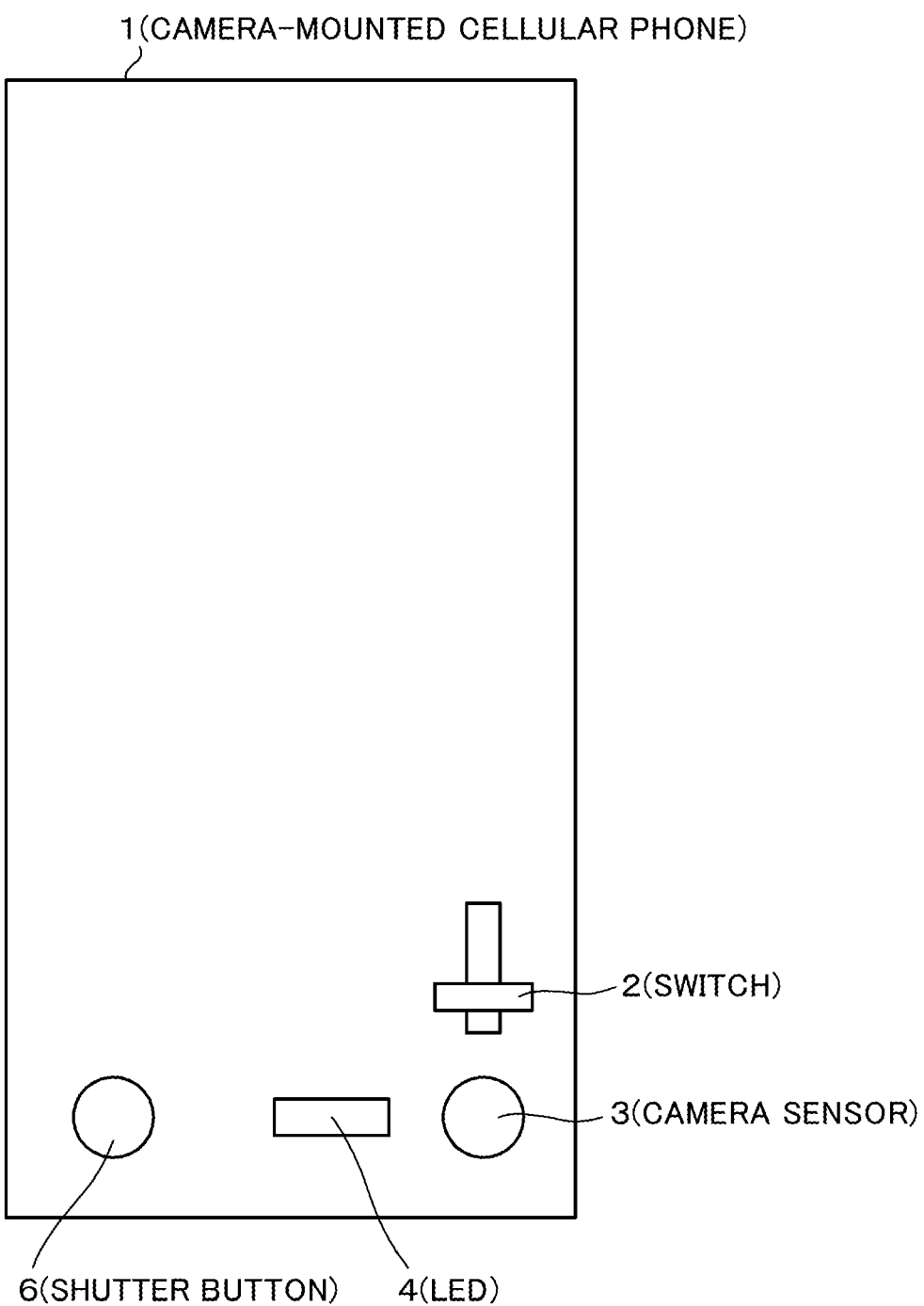
FIG. 1 is a schematic view showing the external configuration of a camera-mounted cellular phone.

DESCRIPTION OF REFERENCE NUMERALS 1, 11 Camera-mounted cellular phone
2 Switch
3 Camera sensor
4, 9, 10 LED
5 Control unit
51 Operation mode detecting unit
52 Camera control unit
53 LED control unit
6 Shutter button Best Mode for Carrying Out the Invention The configuration and the operation of the present invention will be explained in detail in a first embodiment and a second embodiment. Note that, in the first embodiment, an explanation will be given by exemplifying a camera-mounted cellular phone with a piece of light-emission means. Moreover, in the second embodiment, an explanation will be given by exemplifying a camera-mounted cellular phone with two pieces of light-emission means. Note that the present invention is not limited to a camera-mounted cellular phone, but can be applied to any information processing terminal equipped with an image-pickup device, e.g., a PDA, an electronic diary, or a portable gaming machine. Moreover, the present invention is not limited to an information processing terminal equipped with an image-pickup device, but can be applied to the image-pickup device (camera) itself.

First Embodiment

Figure 2:
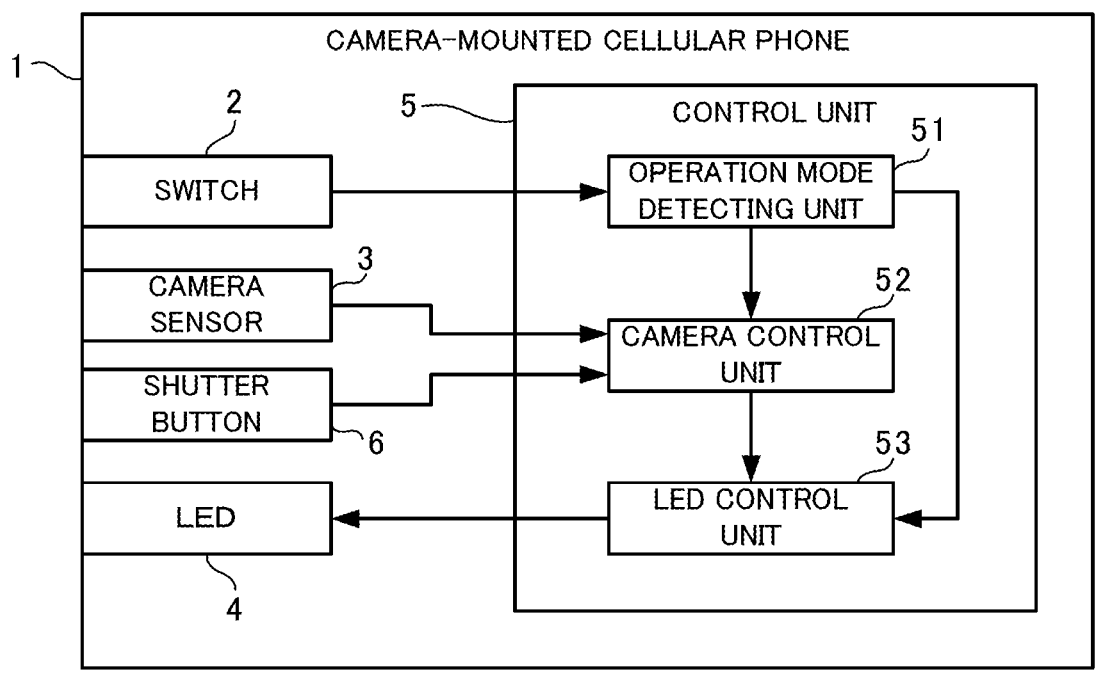
FIG. 2 is a block diagram showing the configuration of the camera-mounted cellular phone.
Figure 3:
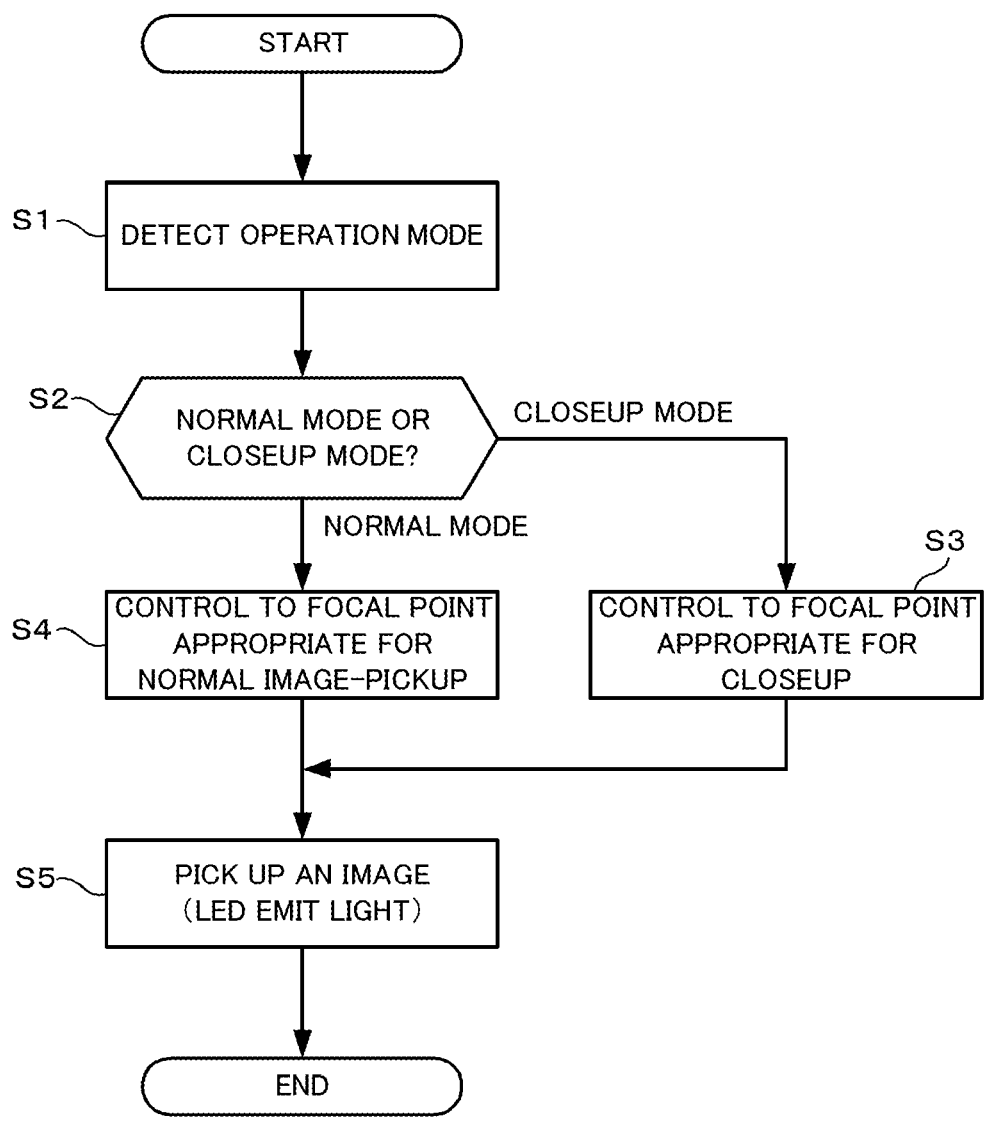
FIG. 3 is a flowchart showing a light-emission operation of an LED.
Figure 4:
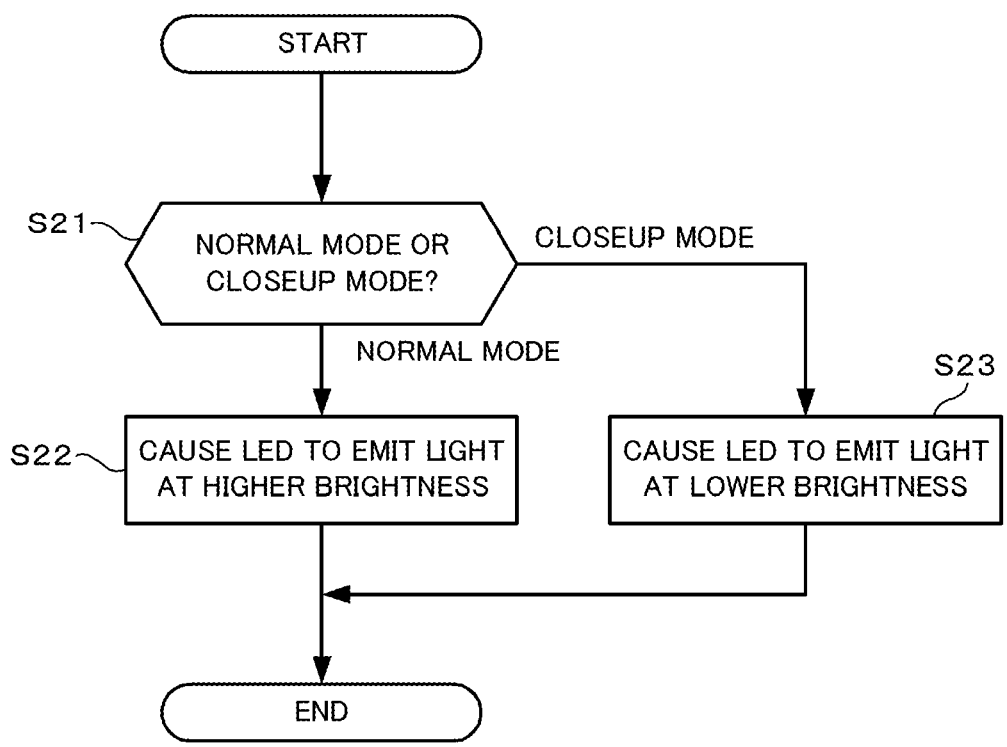
FIG. 4 is a flowchart showing a light-emission control for the LED in detail.

An explanation will be given of the first embodiment of the present invention with reference to FIG. 1 to FIG. 5. FIG. 1 is a schematic view showing the external configuration of a camera-mounted cellular phone 1 with a piece of light-emission means. FIG. 2 is a block diagram showing the configuration of the camera-mounted cellular phone 1. FIG. 3 is a flowchart showing a light-emission operation of an LED 4 which is the light-emission means. FIG. 4 is a flowchart showing a light-emission control for the LED 4 which is the light-emission means in detail. FIG. 5 is a table summarizing a relation between an operation mode switched and set and the luminous brightness of the LED 4.

Configuration

As shown in FIG. 1, the camera-mounted cellular phone 1 comprises a switch 2, a camera sensor 3 which acquires (picks up) an image around the camera-mounted cellular phone 1 (an object), the LED 4 which is the light-emission means, and a shutter button 6. The switch 2 (operation mode setting means) is for switching an image-pickup operation mode in response to a distance (an image-pickup distance) from the camera sensor 3 to an object. For example, an operator can set (select) an operation mode by manipulating the switch 2.

The camera sensor 3 has two operation modes each corresponding to an image-pickup distance from the camera sensor 3 (camera unit) to an object: a normal mode; and a closeup mode. These two operation modes can be switched by the switch 2. Note that the normal mode is the most appropriate operation mode when an image is picked up at a normal image-pickup distance. The closeup mode is the most appropriate operation mode when an image is picked up (closeup) at a shorter image-pickup distance than that of image-pickup in the normal mode. Moreover, the camera sensor 3 acquires (picks up) an image around the camera-mounted cellular phone 1 through an operation in accordance with a set operation mode. The camera sensor 3 includes an image sensor, such as a CCD (Charge Coupled Device) or a CMOS (Complementary Metal Oxide Semiconductor).

The LED 4 has a function of emitting light substantially simultaneously together with an image-pickup operation, and of notifying an image-pickup action to an object and people around the user of the camera-mounted cellular phone 1. The LED 4 is arranged near the camera sensor 3, and in the first embodiment, is arranged adjacent to the camera sensor 3.

The shutter button 6 is to be pressed at the time of image-pickup. The camera sensor 3 starts image-pickup as the shutter button 6 is pressed.

An explanation will be given of the overall configuration of the camera-mounted cellular phone 1 with reference to FIG. 2. The camera-mounted cellular phone 1 has a control unit 5 thereinside. The control unit 5 comprises a CPU (Central Processing Unit), a ROM (Read Only Memory), a RAM (Random Access Memory), and the like, and controls the camera-mounted cellular phone 1 entirely. More specifically, various control processes by the control unit 5 are executed by the CPU which runs a control program stored in the ROM while using the RAM as a work area and storing various data therein temporarily. Moreover, the control unit 5 controls not only a communication operation by the camera-mounted cellular phone 1, but also an image-pickup operation by the camera sensor 3. Furthermore, the control unit 5 comprises an operation mode detecting unit 51, a camera control unit 52, and an LED control unit 53.

The operation mode detecting unit 51 is connected to the switch 2. The operation mode detecting unit 51 detects an operation mode switched as the operator manipulates the switch 2. That is, the operation mode detecting unit 51 is operation mode detecting means which detects whether the operation mode is the closeup mode or the normal mode. The operation mode detecting unit 51 notifies the detected operation mode to the camera control unit 52 and to the LED control unit 53.

The camera control unit 52 is connected to the camera sensor 3 and the shutter button 6, and controls the operation of the camera sensor 3. More specifically, the camera control unit 52 detects pressing of the shutter button 6. At this time, the camera control unit 52 sets the focal point of the camera sensor 3 in accordance with the operation mode detected by the operation mode detecting unit 51, and causes the camera sensor 3 to perform image-pickup.

Moreover, at the time of image-pickup, the camera control unit 52 transmits a request of lighting-up of the LED 4 to the LED control unit 53.

The LED control unit 53 is connected to the LED 4, and controls the light-emission of the LED 4. More specifically, when receiving the lighting-up request from the camera control unit 52, the LED control unit 53 controls the LED 4 in such a manner as to emit light simultaneously with or before and after the image-pickup operation at brightness corresponding to the operation mode detected by the operation mode detecting unit 51. For example, when the operation mode detected by the operation mode detecting unit 51 is the closeup mode, the LED control unit 53 so controls the LED 4 as to emit light at lower brightness than that in the normal mode.

Operation

Next, an explanation will be given of the image-pickup operation of the camera-mounted cellular phone 1 with reference to FIG. 3. First, the operator manipulates the switch 2 to switch an operation mode. In response to the switching manipulation, the operation mode detecting unit 51 detects the switched operation mode (step S1: operation mode detection step). Next, the operation mode detecting unit 51 determines whether the detected operation mode is the normal mode or the closeup mode (step S2).

When it is determined that the operation mode is the closeup mode (step S2; closeup mode), the camera control unit 52 so controls the camera sensor 3 as to set the focal point (a focal position) thereof to be an appropriate focal point (a focal position) for a short-range image-pickup (closeup) (step S3).

When it is determined that the operation mode is the normal mode (step S2; normal mode), the camera control unit 52 so controls the camera sensor 3 as to set the focal point (a focal position) thereof to be an appropriate focal point (a focal position) for a normal-range image-pickup (step S4).

Thereafter, when detecting that the shutter button 6 is pressed by the operator (a person who picks up an image), the camera control unit 52 controls the camera sensor 3 and performs image-pickup at the focal point (the focal position) set in the step S3 or the step S4 (step S5). Moreover, together with the image-pickup operation by the camera control unit 52, the LED control unit 53 causes the LED 4 to emit light at brightness based on the operation mode determined in the step S2 (step S5: image-pickup light emission control step).

Through the foregoing processes, the image-pickup operation of the camera-mounted cellular phone 1 completes.

Next, an explanation will be given of a light-emission control for the LED 4 by the LED control unit 53 in detail with reference to FIG. 4. More specifically, an explanation will be given of an operation of the LED control unit 53 in the process at the step S5 in FIG. 3.

The LED control unit 53 receives a lighting-up request for causing the LED 4 to emit light from the camera control unit 52 at the time of image-pickup. In response to the lighting-up request, the LED control unit 53 executes a process of controlling the light-emission of the LED 4.

First, the LED control unit 53 determines whether the operation mode detected (determined) by the operation mode detecting unit 51 is the normal mode or the closeup mode (step S21).

When determining that the operation mode is the normal mode (step S21; normal mode), the LED control unit 53 so controls the LED 4 as to emit light at higher brightness than that of light-emission in the closeup mode (step S22). Moreover, when determining that the operation mode is the closeup mode (step S21; closeup mode), the LED control unit 53 so controls the LED 4 as to emit light at lower brightness than that of light-emission in the normal mode (step S23).

Through the foregoing processes, the light-emission control process for the LED 4 by the LED control unit 53 completes.

FIG. 5 is a table summarizing a relation between the operation mode of the camera-mounted cellular phone 1 and the setting of the luminous brightness of the LED 4. As shown in FIG. 5, in a case of the normal mode, the luminous brightness of the LED 4 is set high. That is, in the case of the normal mode, because an image-pickup distance to an object is far, it is necessary to cause the LED 4 to emit light at brightness sufficient for allowing the object and people around the user of the camera-mounted cellular phone 1 to recognize an image-pickup action. Conversely, in a case of the closeup mode, the luminous brightness of the LED 4 is set low. This is to suppress any light from the LED 4 which goes around the camera sensor 3. This makes it possible to acquire an image picked up with a good quality.

As explained above, by changing the luminous brightness of the LED 4 in accordance with an operation mode corresponding to an image-pickup distance, light-emission appropriate for the image-pickup distance can be performed. For example, when light-emission is performed at high brightness, it is possible to appropriately notify an image-pickup action to an object and people around the user of the camera-mounted cellular phone 1 at the time of image-pickup. Moreover, when light-emission is performed at low brightness, it is possible to prevent light from the LED 4 from going around the camera sensor 3 and coming therein at the time of image-pickup. Because of these actions, by changing the brightness of the LED 4, visibility for people around the user of the camera-mounted cellular phone 1 and an image with a good quality can be both acquired.

Note that, in the first embodiment, means which allows the operator to switch an operation mode is not limited to the switch. Any switching means can be employed like switching through a key operation to the cellular phone. Moreover, the operation mode configured to be switchable is not limited to two operation modes. For example, a number of operation modes configured to be switchable may be set, and a plurality of luminous brightness in accordance with such operation modes may be set.

Second Embodiment

Figure 6:
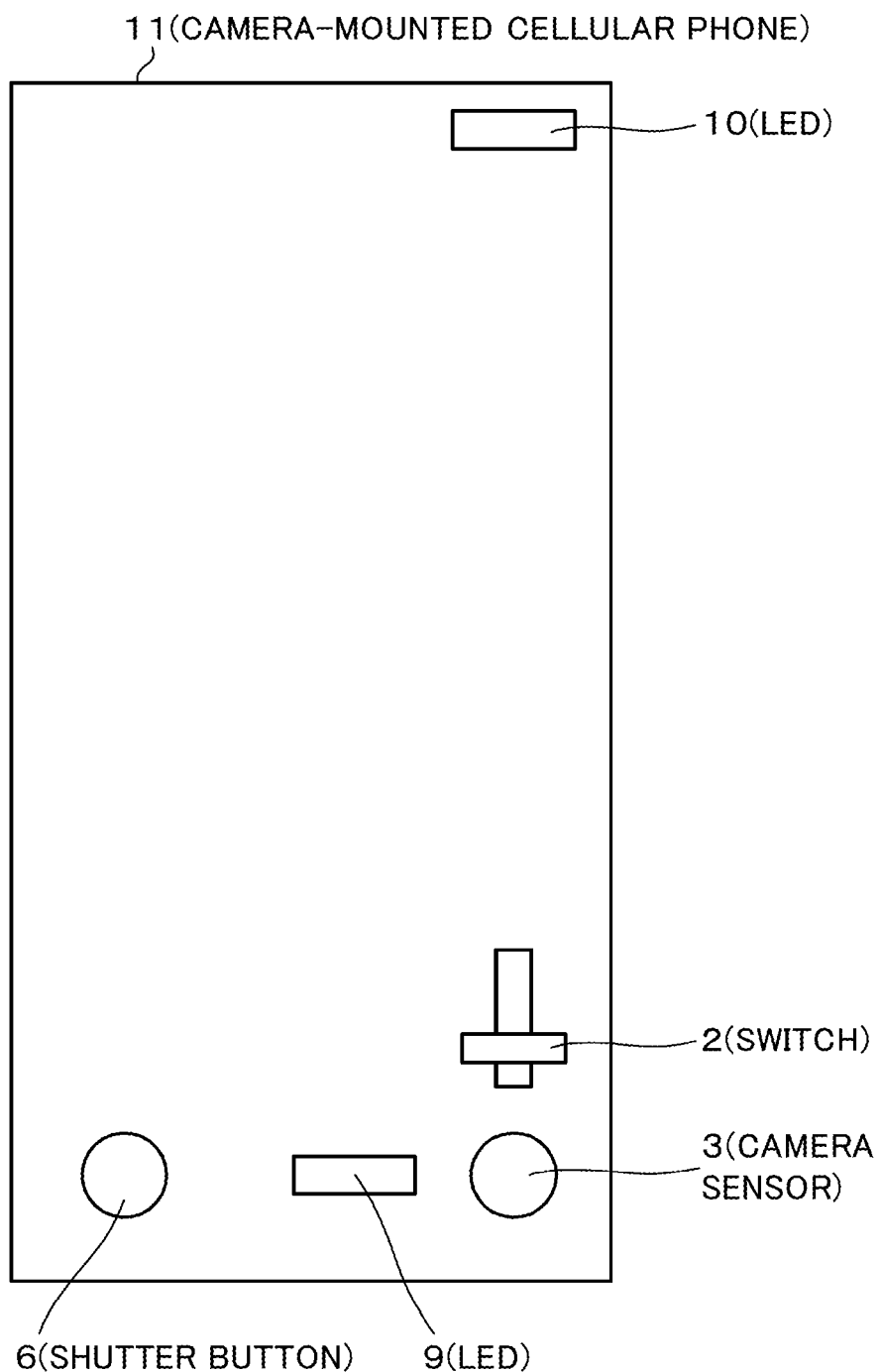
FIG. 6 is a schematic view showing the external configuration of a camera-mounted cellular phone.
Figure 7:
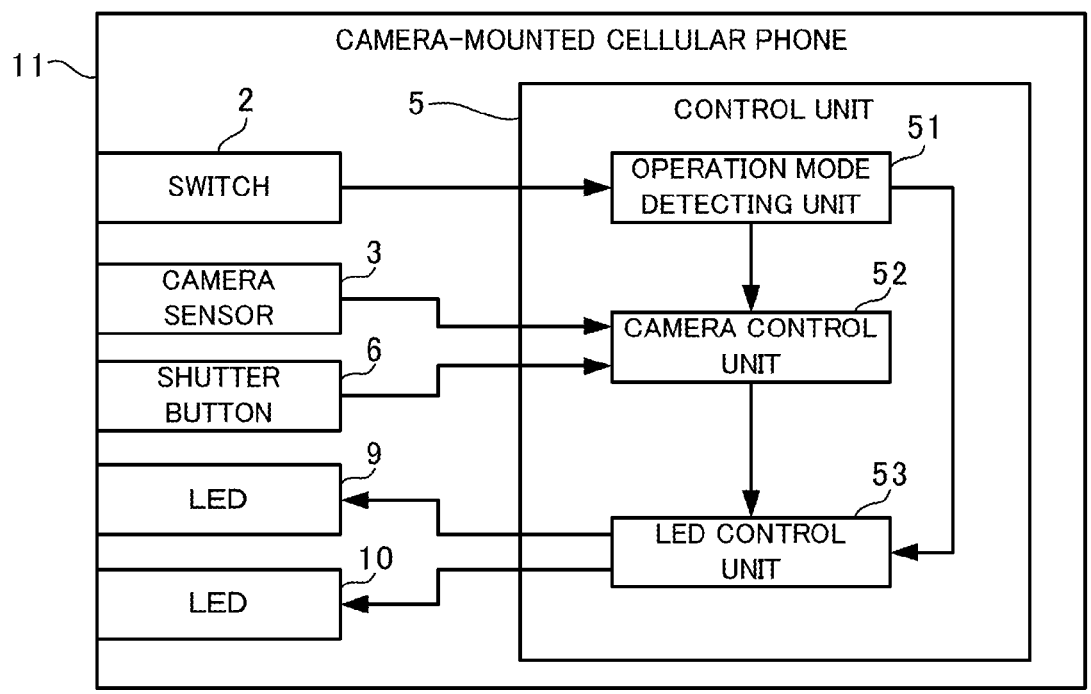
FIG. 7 is a block diagram showing the configuration of the camera-mounted cellular phone.
Figure 8:
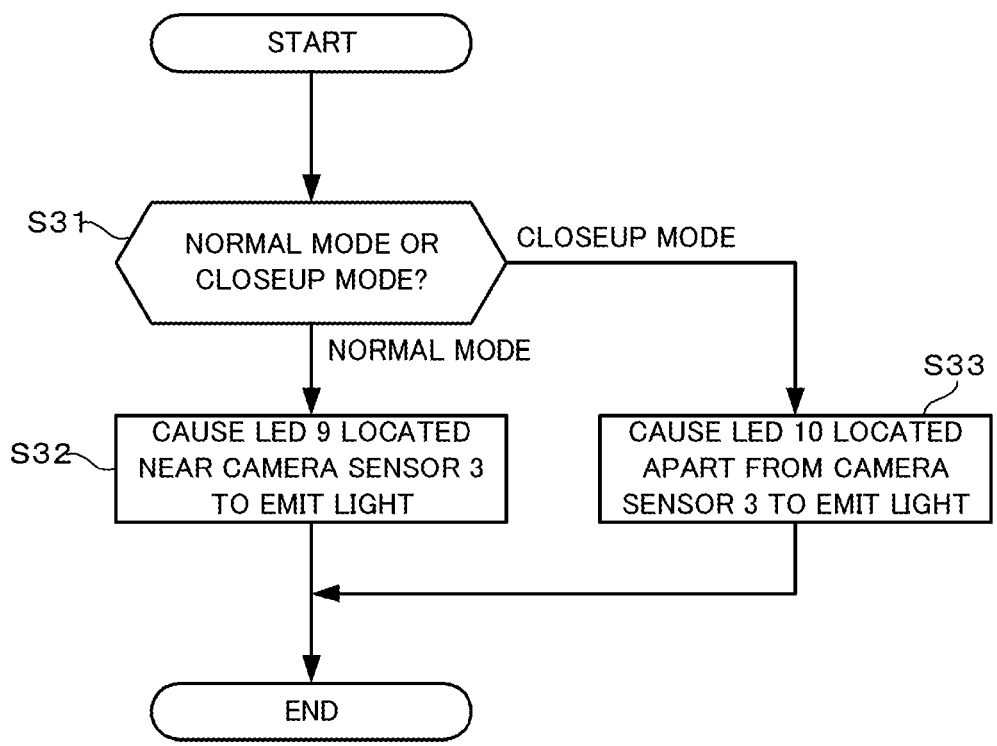
FIG. 8 is a flowchart showing a light-emission control for two LEDs in detail.

Next, an explanation will be given of the second embodiment of the present invention with reference to FIG. 6 to FIG. 9. FIG. 6 is a schematic view showing the external configuration of a camera-mounted cellular phone 11 with two pieces of light-emission means. FIG. 7 is a block diagram showing the configuration of the camera-mounted cellular phone 11. FIG. 8 is a flowchart showing a light-emission control for two LEDs that are the light-emission means in detail. FIG. 9 is a table summarizing a relation among an operation mode switched and set, the light-emission means, and luminous brightness. Note that, in the second embodiment, the same structural element will be denoted by the same reference numeral as that of the first embodiment.

Configuration

FIG. 6 shows the camera-mounted cellular phone 11 equipped with two pieces of light-emission means. The camera-mounted cellular phone 11 comprises the switch 2 which selects an image-pickup distance and switches it at the time of image-pickup, the camera sensor 3 which acquires an image around the camera-mounted cellular phone 11, two LEDs 9 and 10 which are the light-emission means, and the shutter button 6. The switch 2 (operation mode setting means) is for switching an image-pickup operation mode in accordance with an image-pickup distance like the first embodiment. For example, an operator can set (select) an operation mode by manipulating the switch 2.

The camera sensor 3 has two operation modes each corresponding to an image-pickup distance from the camera sensor 3 (camera unit) to an object: the normal mode; and the closeup mode like the first embodiment. These two operation modes can be switched and set by the switch 2. Note that the normal mode is the most appropriate operation mode when an image is picked up at a normal image-pickup distance. The closeup mode is the most appropriate operation mode when an image is picked up (closeup) at a shorter image-pickup distance than that of image-pickup in the normal mode. Moreover, the camera sensor 3 acquires (picks up) an image around the camera-mounted cellular phone 11 through an operation in accordance with a set operation mode. The camera sensor 3 includes an image sensor, such as the CCD or the CMOS.

Both the LEDs 9 and 10 have a function of emitting light at substantially same time with an image-pickup operation, and of notifying an image-pickup action to an object and people around the user of the camera-mounted cellular phone 11. The LED 9 is arranged adjacent to the vicinity of the camera sensor 3, and emits light at the time of image-pickup in the normal mode. In contrast, the LED 10 is arranged in a position apart from the camera sensor relative to the LED 9, and emits light at the time of image-pickup in the closeup mode.

The shutter button 6 is to be pressed at the time of image-pickup. The camera sensor 3 starts image-pickup as the shutter button 6 is pressed.

An explanation will be given of the overall configuration of the camera-mounted cellular phone 11 with reference to FIG. 7. The camera-mounted cellular phone 11 has the control unit 5 thereinside which controls the operation of the camera-mounted cellular phone 11 entirely like the first embodiment. Moreover, the control unit 5 controls not only a communication operation by the camera-mounted cellular phone 11, but also an image-pickup operation by the camera sensor 3. Furthermore, the control unit 5 comprises the operation mode detecting unit 51, the camera control unit 52, and the LED control unit 53.

The operation mode detecting unit 51 is connected to the switch 2, and detects a switched operation mode like the first embodiment.

The camera control unit 52 is connected to the camera sensor 3 and the shutter button 6, and controls the operation of the camera sensor 3 like the first embodiment.

Moreover, at the time of image-pickup, the camera control unit 52 transmits a request of lighting-up of the LED 9 or the LED 10 to the LED control unit 53.

The LED control unit 53 is connected to the LEDs 9 and 10, and controls the light-emission of the two LEDs 9 and 10. More specifically, the LED control unit 53 selects either one of the two LEDs 9 or 10 when receiving the lighting-up request from the camera control unit 52. The LED control unit 53 controls, simultaneously with or before and after the image-pickup operation, the LEDs 9 and 10 in such a way that either one of the selected LED 9 or LED 10 emits light at brightness in accordance with the operation mode detected by the operation mode detecting unit 51. For example, at the time of the closeup mode, the LED control unit 53 controls the LED 10 arranged in the position apart from the camera sensor 3 to emit light. The second embodiment differs from the first embodiment in the process of controlling light-emission executed by the LED control unit 53.

Operation

Next, an explanation will be given of an image-pickup operation of the camera-mounted cellular phone 11. The second embodiment has a substantially same image-pickup operation as that of the first embodiment, so that the explanation will be given with reference to FIG. 3. First, the operator manipulates the switch 2 to switch an operation mode. In response to the switching manipulation, the operation mode detecting unit 51 detects the switched operation mode (step S1). Next, the operation mode detecting unit 51 determines whether the detected operation mode is the normal mode or the closeup mode (step S2).

When it is determined that the operation mode is the closeup mode (step S2; closeup mode), the camera control unit 52 so controls the camera sensor 3 as to set the focal point (a focal position) thereof to be an appropriate focal point (a focal position) for a short-range image-pickup (closeup) (step S3).

When it is determined that the operation mode is the normal mode (step S2; normal mode), the camera control unit 52 so controls the camera sensor 3 as to set the focal point (a focal position) thereof to be an appropriate focal point (a focal position) for a normal-range image-pickup (step S4).

Thereafter, when detecting that that the shutter button 6 is pressed by the operator (a person who picks up an image), the camera control unit 52 controls the camera sensor 3 and picks up an image at the focal point (the focal position) of the camera sensor 3 set in the step S3 or the step S4 (step S5). Moreover, together with the image-pickup operation by the camera control unit 52, the LED control unit 53 causes either one of the LED 9 or the LED 10 to emit light based on the operation mode determined in the step S2 (step S5).

Through the foregoing processes, the image-pickup operation of the camera-mounted cellular phone 11 completes.

Next, an explanation will be given of a light-emission control for the two LEDs 9 and 10 by the LED control unit 53 in detail with reference to FIG. 8. More specifically, the explanation will be given of an operation of the LED control unit 53 in the process at the step S5 in FIG. 3.

At the time of image-pickup, the LED control unit 53 receives a lighting-up request for causing either one of the LEDs 9 or 10 to emit light from the camera control unit 52. In response to the lighting-up request, the LED control unit 53 performs the light-emission control on the LEDs 9 and 10.

First, the LED control unit 53 determines whether the operation mode detected (determined) by the operation mode detecting unit 51 is the normal mode or the closeup mode (step S31).

When determining that the operation mode is the normal mode (step S31; normal mode), the LED control unit 53 causes the LED 9 located near (adjoining) the camera sensor 3 to emit light (step S32). Consequently, the light-emission means (the LED 9) located near (adjoining) the camera sensor 3 is caused to emit light. This facilitates the object and people around the user of the camera-mounted cellular phone 11 to visibly recognize an image-pickup operation.

Moreover, when determining that the operation mode is the closeup mode (step S31; closeup mode), the LED control unit 53 causes the LED 10 located apart from the camera sensor 3 to emit light (step S33). Consequently, the light-emission means (the LED 10) located apart from the camera sensor 3 is caused to emit light, and this can prevent light from going around the camera sensor 3 and coming therein.

Through the foregoing processes, the process of controlling the light-emission of the LEDs 9 and 10 by the LED control unit 53 completes.

In this manner, the LED control unit 53 according to the second embodiment switches the LEDs 9 and 10 in accordance with an operation mode selected by the switch 2 and cause such an LED to emit light. This enables acquisition of an image picked up with a good quality together with appropriate notification of an image-pickup action to an object or people around the user of the camera-mounted cellular phone 11 without changing the luminous brightness of the LED.

The light-emission control by the LED control unit 53 is not limited to the foregoing light-emission control. For example, the LED control unit 53 may control the LEDs 9 and 10 so as to emit light at brightness corresponding to an operation mode simultaneously with switching of the light-emission of the two LEDs 9 and 10 as explained above. The control for the luminous brightness of the LEDs 9 and 10 is same as that of the first embodiment.

FIG. 9 shows a relation between the LEDs 9 and 10 that are the light-emission means and luminous brightness thereof when controlled as explained above. In FIG. 9, operation modes switchable are the normal mode and the closeup mode. When the operator selects the normal mode, the LED control unit 53 selects the LED 9 adjoining the camera sensor 3. The LED control unit 53 controls the selected LED 9 so as to emit light at higher brightness than that of an image-pickup in the closeup mode at the time of image-pickup. Consequently, the LED 9 located near the camera sensor 3 is caused to emit light at higher brightness. This enables further improvement of the visibility to people around the user of the camera-mounted cellular phone 11.

Moreover, when the operator selects the closeup mode, the LED control unit 53 selects the LED 10 located apart from the camera sensor 3. The LED control unit 53 controls the selected LED 10 so as to emit light at lower brightness than that of an image-pickup in the normal mode at the time of image-pickup. Consequently, the LED 10 located apart from the camera sensor 3 is caused to emit light at lower brightness. This further prevents light from going around the camera sensor 3.

The foregoing setting (light-emission control) can be realized by setting the control unit 5 beforehand. However, the relation between switching of the light-emission means (the LEDs 9 and 10) and luminous brightness thereof is not limited to FIG. 9.

For example, the LED 9 arranged near the camera sensor 3 may be set (controlled) so as to emit light at lower brightness.

Accordingly, the visibility of an image-pickup action can be ensured as the LED 9 is arranged near the camera sensor 3, and light can be prevented from going around the camera sensor 3 by lowering the luminous brightness.

Conversely, the LED 10 arranged apart from the camera sensor 3 may be set (controlled) so as to emit light at higher brightness. This prevents light from going around the camera sensor 3 because the LED 10 is located apart therefrom. Furthermore, the visibility of the image-pickup action can be ensured as the LED 10 emits light at high brightness.

Note that, as explained in the second embodiment, the means which allows the operator to switch an operation mode is not limited to the switch. For example, the operation mode can be switched through the key operation to the cellular phone. Moreover, the number of operation modes switchable is not limited to two modes. Furthermore, the cellular phone may have equal to or more than two pieces of light-emission means (LEDs). For example, N number of operation modes switchable each corresponding to an image-pickup distance may be set, N number of light-emission means (LEDs) which correspond to each set operation mode may be arranged at respective different positions apart from the camera sensor 3, and when an image-pickup distance corresponding to an operation mode switched by the switch is longer and longer, an LED located closer and closer to the camera sensor 3 may be controlled (light-emission control) so as to emit light at the time of image-pickup.

This application is based on Japanese Patent Application No. 2007-302529 filed on Nov. 22, 2007. The specification, claims, and drawings of this application are entirely incorporated herein by reference in this specification.

INDUSTRIAL APPLICABILITY

The present invention is not limited to a cellular phone equipped with an image-pickup device, but can be applied to any information processing terminal, such as a PDA, an electronic diary, or a portable gaming machine. Moreover, the present invention is not limited to an information processing terminal equipped with an image-pickup device, but can be applied to an image-pickup device itself, and has an industrial applicability.

The invention claimed is:

1. An image-pickup device comprising a camera unit which picks up an image, a first light-emission unit which emits light together with an image-pickup operation by the camera unit, and a second light-emission unit which is arranged apart from the camera unit relative to the first light-emission unit and which emits light together with an image-pickup operation by the camera unit, the image-pickup device further comprising:
   an operation mode setting unit which is configured to switch and set a first operation mode corresponding to a first image-pickup distance from the camera unit to an object and a second operation mode corresponding to a second image-pickup distance longer than the first image-pickup distance;
   a camera control unit which performs an image-pickup operation by controlling a focal point of the camera unit in accordance with an operation mode switched and set by the operation mode setting unit; and
   a light-emission control unit which only controls the second light-emission unit to emit light when the operation mode setting unit switches and sets the first operation mode, and controls only the first light-emission unit to emit light when the operation mode setting unit switches and sets the second operation mode, wherein the light-emission control unit controls the first light-emission unit or the second light-emission unit to emit light at respective different brightnesses corresponding to the operation mode switched and set by the operation mode setting unit.

2. A non-transitory recording medium storing a program which allows a control unit of an image-pickup device comprising a camera unit that picks up an image, a first light-emission unit which emits light together with an image-pickup operation by the camera unit, and a second light-emission unit which is arranged apart from the camera unit relative to the first light-emission unit and which emits light together with an image-pickup operation by the camera unit to function as:
   an operation mode setting unit which is configured to switch and set a first operation mode corresponding to a first image-pickup distance from the camera unit to an object and a second operation mode corresponding to a second image-pickup distance longer than the first image-pickup distance;
   a camera control unit which performs an image-pickup operation by controlling a focal point of the camera unit in accordance with an operation mode switched and set by the operation mode setting unit; and
   a light-emission control unit which controls the second light-emission unit to emit light when the operation mode setting unit switches and sets the first operation mode, and controls only the first light-emission unit to emit light when the operation mode setting unit switches and sets the second operation mode, wherein the light-emission control unit controls only the first light-emission unit or the second light-emission unit to emit light at respective different brightnesses corresponding to the operation mode switched and set by the operation mode setting unit.

3. A method of controlling light-emission of light-emission unit in an image-pickup device comprising a camera unit which picks up an image, a first light-emission unit which emits light together with an image-pickup operation by the camera unit, and a second light-emission unit which is arranged apart from the camera unit relative to the first light-emission unit and which emits light together with an image-pickup operation by the camera unit, the method comprising:
   an operation mode setting step to switch and set a first operation mode corresponding to a first image-pickup distance from the camera unit to an object and a second operation mode corresponding to a second image-pickup distance longer than the first image-pickup distance;
   a camera control step to perform an image-pickup operation by controlling a focal point of the camera unit in accordance with an operation mode switched and set by the operation mode setting step; and
   a light-emission control step to control the second light-emission unit to emit light when the operation mode setting unit switches and sets the first operation mode, and to control the first light-emission unit to emit light when the operation mode setting unit switches and sets the second operation mode, wherein
   the light-emission control step controls only the first light-emission unit or the second light-emission unit to emit light at respective different brightnesses corresponding to the operation mode switched and set by the operation mode setting step.

4. The image-pickup device according to claim 1, wherein the light-emission control unit controls the first light-emission unit to emit light at a brightness higher than a brightness at which the second light-emission unit emits light, when the operation mode setting unit switches and sets the second operation mode.

5. The image-pickup device according to claim 1, wherein the light-emission control unit controls the first light-emission unit to emit light at a-brightness lower than a brightness at which the second light-emission unit emits light, when the operation mode setting unit switches and sets the second operation mode.

* * * * *